United States Patent
Lee et al.

(10) Patent No.: US 6,767,756 B2
(45) Date of Patent: Jul. 27, 2004

(54) METHOD OF MANUFACTURING TAPERED OPTICAL WAVEGUIDE

(75) Inventors: Joo-Hoon Lee, Yongin-shi (KR); Duk-Yong Choi, Anyang-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/453,100

(22) Filed: Jun. 3, 2003

(65) Prior Publication Data

US 2004/0005118 A1 Jan. 8, 2004

(30) Foreign Application Priority Data

Jul. 3, 2002 (KR) .......................................... 2002-38169

(51) Int. Cl.$^7$ .............................................. H01L 21/00

(52) U.S. Cl. ............................. 438/31; 385/43; 385/31; 385/129; 438/40; 438/43

(58) Field of Search .............................. 438/31, 40, 43; 385/31, 43, 129

(56) References Cited

U.S. PATENT DOCUMENTS

| | | | | |
|---|---|---|---|---|
| 3,779,628 A | * | 12/1973 | Kapron et al. | 385/43 |
| 4,855,255 A | * | 8/1989 | Goodhue | 117/105 |
| 4,938,841 A | * | 7/1990 | Shahar et al. | 438/701 |
| 4,944,838 A | * | 7/1990 | Koch et al. | 438/751 |
| 5,792,674 A | * | 8/1998 | Kitamura | 438/31 |
| 5,910,012 A | * | 6/1999 | Takeuchi | 438/31 |
| 5,985,685 A | * | 11/1999 | Lealman et al. | 438/31 |
| 2003/0108319 A1 | * | 6/2003 | Chong et al. | 385/129 |

FOREIGN PATENT DOCUMENTS

EP    0657753 A2  * 11/1994  ............ G02B/6/12

* cited by examiner

Primary Examiner—Matthew Smith
Assistant Examiner—Belur Keshavan
(74) Attorney, Agent, or Firm—Cha &Reiter, L.L.C.

(57) ABSTRACT

Disclosed is a method for manufacturing a tapered optical waveguide through which waveguides of different sizes are connected with each other optically. In the method, a photo-resist pattern having an inclined profile is formed on the core layer by means of a gray-scale mask, then the profile of the tapered waveguide can be precisely controlled by controlling the profile of the photo-resist pattern and the etching-selection ratio between the photo-resist and the core layer.

6 Claims, 5 Drawing Sheets

METHOD OF MANUFACTURING TAPERED OPTICAL WAVEGUIDE

CLAIM OF PRIORITY

This application claims priority to an application entitled "METHOD OF MANUFACTURING TAPERED OPTICAL WAVEGUIDE," filed in the Korean Intellectual Property Office on Jul. 3, 2002 and assigned Serial No. 2002-38169, the contents of which are hereby incorporated by reference.

BACKGROUND OF THE INVENTION

1. Field of the Invention

The present invention relates to a method of manufacturing an optical waveguide, and more particularly to a method of manufacturing a tapered optical waveguide, through which two optical waveguides of different sizes are connected optically.

2. Description of the Related Art

A waveguide is an indispensable element of an integrated optical component in a high-speed optical-communication network. The waveguide has wide applications used in optical-power splitters, optical couplers, optical modulators, interferometer-based switches, semiconductor lasers, and planar devices for dense wavelength-division-multiplexing communication.

FIG. 1 is a schematic diagram of a wavelength-division multiplexer utilizing an arrayed waveguide grating. The waveguide grating includes input and output waveguides 11a and 11b, two planar waveguides 13a and 13b, and an arrayed waveguide grating 15. In the multiplexer shown in FIG. 1, portions encircled by broken lines—that is, portions in which the width of a waveguide or waveguides abruptly changes—necessarily require some modification of the waveguide or waveguides. When optical waveguides with different constructions are connected with each other directly, the difference in the width of adjoining optical waveguides generates optical loss. This n abrupt change between the connecting joints causes an optical signal to be radiated instead of being propagated through the waveguides. This radiation of the optical signal generates additional loss and noise, thereby causing cross-talk between different channels.

In order to overcome the problems described above, a tapered waveguide, which is inserted between two different widths to connect with each other optically, has been employed.

FIG. 2 is a schematic view of a conventional linear tapered waveguide. As shown, the tapered waveguide 22 has a width increasing from one end of a base waveguide 21 to the other end of a target waveguide 23. However, a lateral taper and a vertical taper must be simultaneously realized in order to lower the coupling loss caused by a mode mismatch. In the conventional method of realizing the vertical taper, a thin film having a thickness profile is deposited and then etched by means of a shadow mask, thereby forming a tapered waveguide. In another method, a thin film having a uniform thickness is etched by a shadow mask, while an etched depth of the thin film is adjusted to allow the thin film to have a thickness profile, then the thin film with the thickness profile is etched again, thereby forming a tapered waveguide. However, in the conventional methods utilizing a shadow mask, it is difficult to control a position, inclination, shape, etc., of a tapered section and to mass-produce tapered waveguides as the shadow mask must be installed above a substrate.

According to another conventional method of manufacturing a tapered waveguide, a thin film is deposited on a stepped substrate, then a flattening process is performed so as to enable the thin film to have a thickness profile. Finally, the thin film having a thickness profile is etched, thereby forming a tapered waveguide. However, in this method, it is difficult to control the inclination and the shape of a tapered section. In addition, a separate flattening process is necessary.

According to another conventional method of manufacturing a tapered waveguide, heat is locally applied to the waveguide after a waveguide with a uniform thickness is formed, thereby enlarging a predetermined portion of the waveguide. In this method, a precise control is impossible in forming the waveguide.

In the conventional methods described above, complicated processes are necessary, and there is a limitation in controlling the tapered profile. Further, it is difficult to employ the conventional methods for a mass-production of waveguides.

SUMMARY OF THE INVENTION

Accordingly, the present invention has been made to solve the above-mentioned problems occurring in the prior art, by providing a method of manufacturing a tapered optical waveguide, in which an optical waveguide having a construction tapered in vertical and horizontal side views can be manufactured through a simple manufacturing process.

Accordingly, this invention provides a method of manufacturing a tapered optical waveguide, the method comprising the steps of: (1) forming an underclad layer and a core layer in sequence on a substrate; (2) forming a photo-resist pattern having an inclined profile on the core layer by means of a gray-scale mask; (3) etching the photo-resist pattern and the core layer to form a first tapered core layer having a side profile equal to that of the tapered optical waveguide to be manufactured; (4) forming a mask pattern on the first tapered core layer, the mask pattern having a planar profile equal to that of the tapered optical waveguide to be manufactured; (5) etching the first tapered core layer utilizing the mask pattern as an etching mask, thereby forming a second tapered core layer; and, (6) forming an overclad layer on the second tapered core layer.

It is preferred that, in step 2, the inclined profile of the photo-resist pattern can be controlled by adjusting ultraviolet-ray transmittance of the gray-scale mask.

More preferably, in step 3, an inclination of the side profile of the first tapered core layer can be controlled by adjusting an etching-selection ratio between the photo-resist and the core layer.

Another aspect of the present invention provides a method of manufacturing a tapered optical waveguide, the method comprising the steps of: (1) forming an underclad layer on a substrate; (2) forming a photo-resist pattern having an inclined profile on the underclad layer by means of a gray-scale mask; (3) etching the photo-resist pattern and the underclad layer to form a tapered underclad layer having a side profile equal to that of the tapered optical waveguide to be manufactured; (4) depositing a core layer on the tapered underclad layer and flattening the core layer, thereby forming a first tapered core layer; (5) forming a mask pattern on the first tapered core layer, the mask pattern having a planar profile equal to that of the tapered optical waveguide to be manufactured; (6) etching the first tapered core layer utilizing the mask pattern as an etching mask, thereby forming a second tapered core layer; and, (7) forming an overclad layer on the second tapered core layer.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Figure 1:
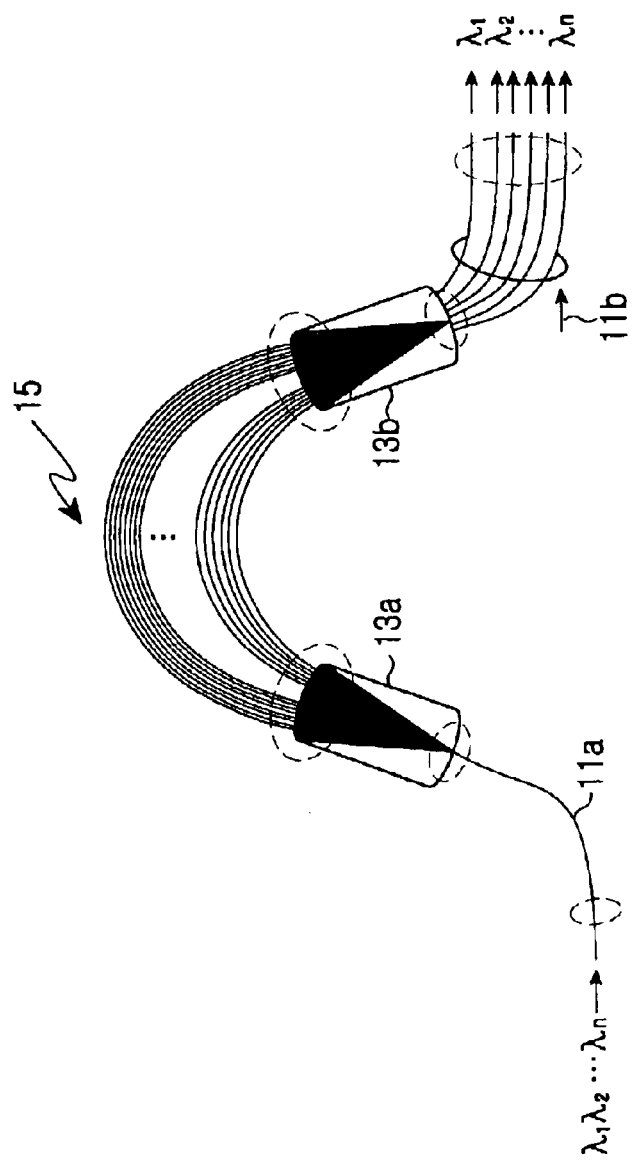
FIG. 1 is a schematic view of a wavelength-division multiplexer according to a prior art.
Figure 2:
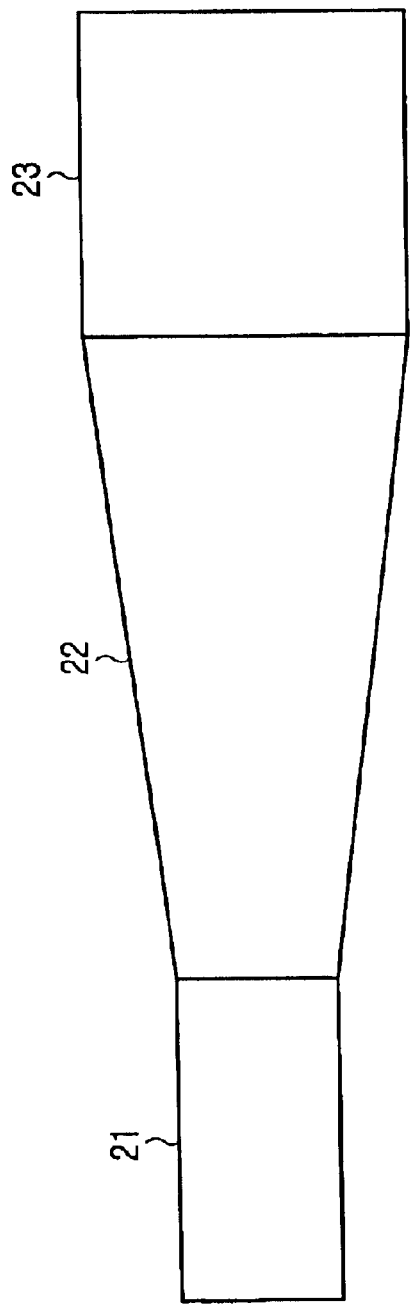
FIG. 2 is a schematic view of the prior-art tapered waveguide.

Hereinafter, preferred embodiments of the present invention will be described in detail with reference to the accompanying drawings. In drawings, the same reference numerals are used to designate the same or similar components, although they shown in different drawings. For the purposes of clarity and simplicity, a detailed description of known functions and configurations incorporated herein will be omitted as it may make the subject matter of the present invention unclear.

FIGS. 3a to 3g are sectional views showing the process of manufacturing a tapered waveguide according to an embodiment of the present invention, in which a core layer having a profile inclined in vertical and horizontal side views is formed. In the specification, the expression "tapered in the vertical side" means that the profile is inclined rightward or leftward from a side view, while the expression "tapered in the horizontal side" means that the profile is inclined rightward or leftward from a planar view.

Figure 3:
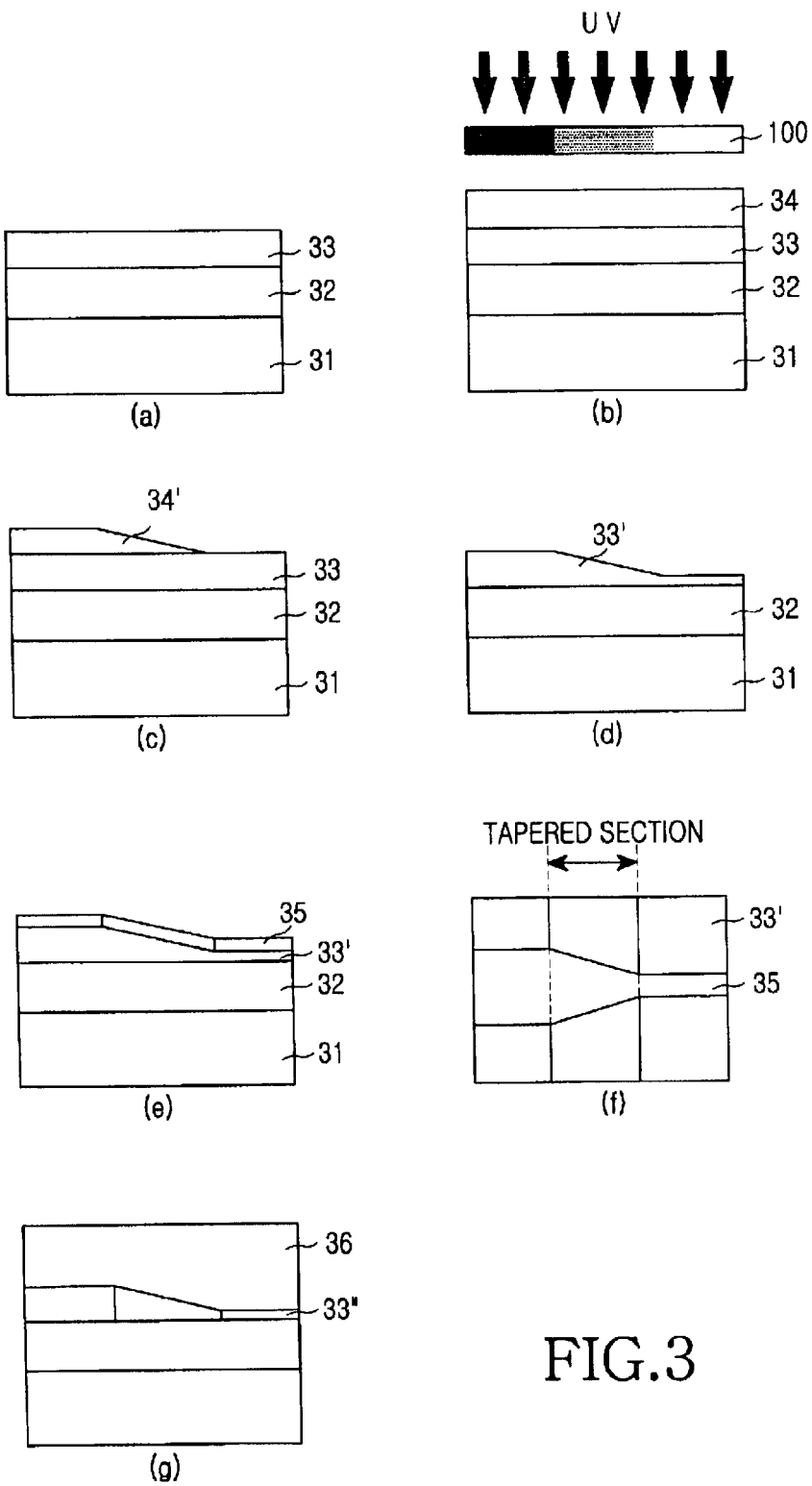
FIGS. 3a to 3g are sectional views showing a process of manufacturing a tapered waveguide according to an embodiment of the present invention.

Initially, as shown in FIG. 3a, an underclad layer 32 and a core layer 33 are deposited in sequence on a substrate 31. Thereafter, as shown in FIG. 3b, a photo-resist 34 is applied on the core layer 33 and then exposed to light through a gray-scale mask 100. Here, by gradually increasing or decreasing ultraviolet-ray transmittance of the gray-scale mask 100, a photo-resist profile having a desired shape can be obtained.

FIG. 3c shows a state in which a photo-resist pattern 34' has been formed as described above. By controlling an exposure level and duration and of the photo-resist to light, the depth of the photo-resist can be changed to form a tapered profile.

Next, as shown in FIG. 3d, a core layer 33' having an inclined profile is formed by dry etching the photo-resist pattern 34' and the core layer 33. To this end, the shape of the photo-resist pattern 34' is transcribed to the core layer. Note that the degree of transcription changes according to the etching-selection ratio between the photo-resist and the core layer. For example, when the etching-selection ratio between the photo-resist and the core layer is 1:1, the profile of the photo-resist pattern 34' is transcribed intact to the core layer 33. Therefore, in order to obtain a core layer having a desired profile, both the profile of the photo-resist pattern 34' and the etching-selection ratio must be considered simultaneously.

Thereafter, as shown in FIG. 3e, a photo-resist is applied to the core layer 33' that is tapered when viewed from the vertical side, then a general photolithography is performed, thereby forming a photo-resist mask pattern 35 for forming an optical waveguide tapered from the horizontal side view.

FIG. 3f is a planar view of the lamination shown in FIG. 3e, in which the shape of the photo-resist mask pattern 35 for forming the optical waveguide tapered when viewed from the horizontal side.

Finally, as shown in FIG. 3g a waveguide 33" is formed by etching the core layer 33' under the photo-resist mask pattern 35 utilizing the photo-resist mask pattern 35 as a mask, then an overclad layer 36 is deposited on the waveguide 33". To this end, the photo-resist mask pattern 35 functions as an etching mask. When necessary, a hard-etching mask may be utilized. That is, a metal or inorganic material, capable of functioning as a hard mask, is deposited on the core layer before applying photo-resist for forming a mask pattern, and a photo-resist mask pattern is formed on the deposited metal or inorganic material through a photolithography. Then, the deposited metal or inorganic material is etched utilizing the photo-resist mask pattern formed in the way described above, thereby forming a hard-mask pattern. The hard-mask pattern may be utilized as an etching mask in etching the core layer.

Figure 4:
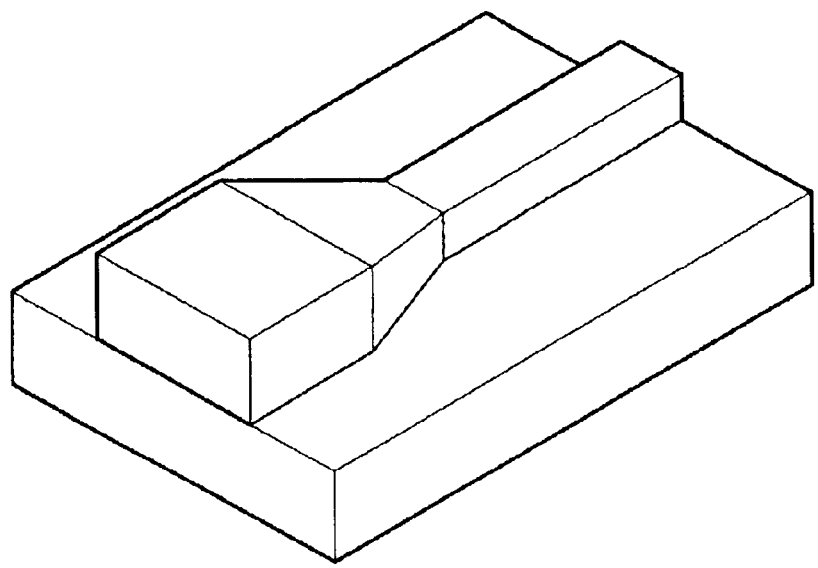
FIG. 4 is a perspective view of a tapered optical waveguide manufactured through the process shown in FIGS. 3a to 3g; and, FIGS. 5a to 5f are sectional views showing a method of manufacturing a tapered waveguide according to another embodiment of the present invention.

FIG. 4 is a perspective view of a core layer on an underclad layer formed through the process shown in FIGS. 3a to 3g which is tapered in the vertical side view (in a side-sectional view) and horizontal side view (in a planar view).

FIGS. 5a to 5f are sectional views showing the process of manufacturing a tapered waveguide according to another embodiment of the present invention, in which the tapered waveguide is manufactured by forming an inclined profile on an underclad layer.

Figure 5:
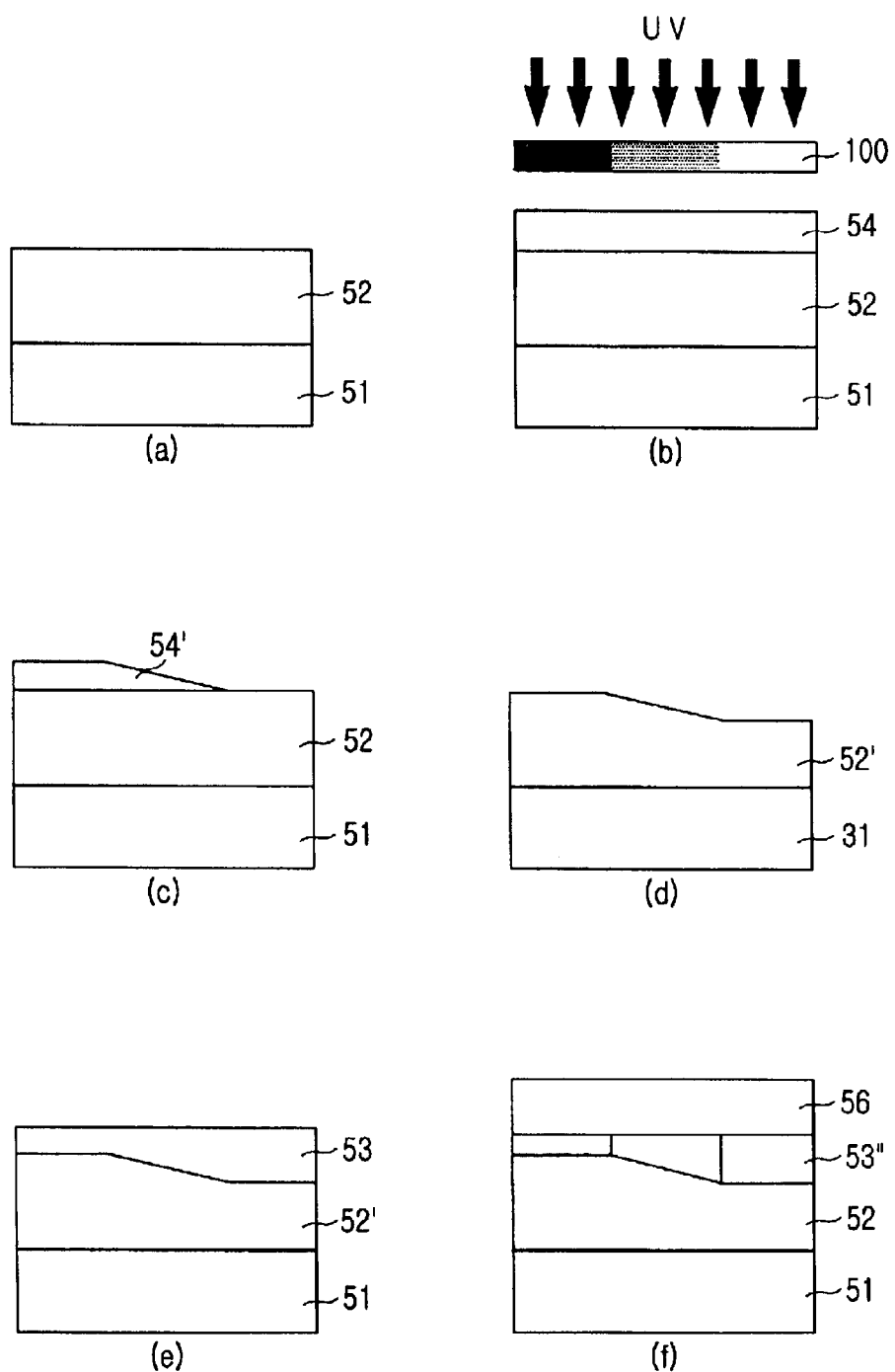

First, an underclad layer 52 is deposited on a substrate 51, as shown in FIG. 5a.

Thereafter, as shown in FIG. 5b, a photo-resist 54 is applied on the underclad layer 52 and then exposed to light through a gray-scale mask 100. In this case, by gradually increasing or decreasing ultraviolet-ray transmittance of the gray-scale mask 100, a photoresist profile having a desired shape can be obtained.

FIG. 5c shows a state in which a photo-resist pattern 54' has been formed by exposing and developing the photo-resist 54 utilizing the gray-scale mask 100. By controlling the degree of exposure of the photo-resist to light, the depth of the photo-resist can be changed, so that a tapered profile can be obtained.

Thereafter, as shown in FIG. 5d, an underclad layer 52' having an inclined profile is formed by dry etching the underclad layer 52 utilizing the photo-resist pattern 54' as an etching mask. To this end, the shape of the photo-resist pattern 54' is transcribed to the underclad layer. Note that the degree of transcription changes according to an etching-selection ratio between the photo-resist and the underclad layer. When the etching-selection ratio between the photo-resist and the underclad layer is 1:1, the profile of the photo-resist pattern 54' is transcribed intact to the underclad layer. Therefore, in order to obtain an underclad layer having a desired profile, both the profile of the photo-resist pattern 54' and the etching-selection ratio must be considered simultaneously.

Thereafter, as shown in FIG. 3e, a core layer 53 is deposited on the underclad layer 52' having an inclined profile, then the deposited core layer 53 is flattened through a flattening step.

Finally, as shown in FIG. 5f, a waveguide 53" is formed by etching the core layer, then an overclad layer 56 is deposited on the waveguide 53". To this end, the core layer may be etched utilizing a photo-resist mask pattern having a profile inclined from the horizontal side or a hard-etching mask in a similar matter (or manner?) as the previous embodiment.

As described above, in the method according to the present invention, as a tapered waveguide—that is, a waveguide having an inclined profile—is manufactured utilizing a gray-scale mask, the manufacturing process is relatively simple and the shape of the waveguide can be controlled precisely. Therefore, the method according to the present invention remarkably can reduce a coupling loss due to spot-size mismatch between optical fibers, composite optical-semiconductor devices, and quartz-based optical-integrated circuits.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of manufacturing a tapered optical waveguide, the method comprising the steps of:

(1) forming an underclad layer and a core layer on a substrate;

(2) forming a photo-resist pattern having an inclined profile on the core layer by exposing a light on the core layer via a gray-scale mask;

(3) etching the photo-resist pattern and the core layer to form a first tapered core layer; (4) forming a mask pattern on the first tapered core layer;

(5) etching the first tapered core layer utilizing the mask pattern as an etching mask, thereby forming a second tapered core layer; and, (6) forming an overclad layer on the second tapered core layer.

2. The method of claim 1, wherein the inclined profile of the photo-resist pattern can be controlled by adjusting ultraviolet-ray transmittance through the gray-scale mask.

3. The method of claim 1, wherein an inclination of the side profile of the first tapered core layer can be controlled by adjusting an etching-selection ratio between the photo-resist and the core layer.

4. A method of manufacturing a tapered optical waveguide, the method comprising the steps of:

(1) forming an underclad layer on a substrate;

(2) forming a photo-resist pattern having an inclined profile on the underclad layer by exposing a light via a gray-scale mask;

(3) etching the photo-resist pattern and the underclad layer to form a tapered underclad layer;

(4) depositing a core layer on the tapered underclad layer and flattening the core layer, thereby forming a first tapered core layer;

(5) forming a mask pattern on the first tapered core layer;

(6) etching the first tapered core layer utilizing the mask pattern as an etching mask, thereby forming a second tapered core layer; and, (7) forming an overclad layer on the second tapered core layer.

5. The method of claim 4, wherein the inclined profile of the photo-resist pattern can be controlled by adjusting ultraviolet-ray transmittance through the gray-scale mask.

6. The method of claim 4, wherein an inclination of the side profile of the tapered underclad layer can be controlled by adjusting an etching-selection ratio between the photo-resist and the underclad layer.

* * * * *